(12) United States Patent
Liu et al.

(10) Patent No.: US 7,711,816 B2
(45) Date of Patent: May 4, 2010

(54) METHOD FOR MANAGING DEVICE DATA AND NETWORK MANAGEMENT SYSTEM

(75) Inventors: Guangwei Liu, Shenzhen (CN); Jie Luo, Shenzhen (CN); Zhonghui Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 704 days.

(21) Appl. No.: 11/607,801

(22) Filed: Dec. 1, 2006

(65) Prior Publication Data

US 2007/0140146 A1  Jun. 21, 2007

(30) Foreign Application Priority Data

Dec. 2, 2005  (CN)  ........................ 2005 1 0102135

(51) Int. Cl.
*H04L 12/56* (2006.01)
(52) U.S. Cl. ........................ 709/224; 709/223; 370/254; 370/395.3
(58) Field of Classification Search ................. 709/223, 709/224
See application file for complete search history.

(56) References Cited

U.S. PATENT DOCUMENTS

| 6,564,341 | B1 * | 5/2003 | Sundaram et al. | 714/43 |
| 2002/0116485 | A1 * | 8/2002 | Black et al. | 709/223 |
| 2003/0126193 | A1 | 7/2003 | Marklund et al. | |
| 2005/0018618 | A1 * | 1/2005 | Mualem et al. | 370/252 |
| 2005/0198247 | A1 * | 9/2005 | Perry et al. | 709/223 |

* cited by examiner

*Primary Examiner*—Wing F Chan
*Assistant Examiner*—Andrew Woo
(74) *Attorney, Agent, or Firm*—Conley Rose, P.C.; Grant Rodolph

(57) ABSTRACT

Embodiments of the present invention disclose a method for managing network device data and a network management system. The method including: storing identifiers respectively for different types of device data at the device side; the network management system storing the identifiers of the different types of device data into a database of the network management system upon synchronizing the device data; and during TRAP message processing and timing data synchronization, the network management system comparing the identifiers locally stored with the identifiers from the device side, and performing a corresponding update according to the comparison result.

13 Claims, 4 Drawing Sheets

METHOD FOR MANAGING DEVICE DATA AND NETWORK MANAGEMENT SYSTEM

FIELD OF THE INVENTION

The present invention relates to technologies for a network management system, and more particularly to a method for managing device data in a network data management system and a network management system.

BACKGROUND OF THE INVENTION

A telecommunication operating device typically supports configuration operations of network management system and command lines. After a user performs a configuration operation on the device with the use of the command lines, the device sends a TRAP message as defined in Simple Network Management Protocol (SNMP) to notify the network management system of occurrence of a change in configuration data of the device. Upon receiving the notification by the TRAP message, the network management system newly obtains the data from the device side and updates the data in a network management database, so that the data in the database of the network management system may be kept in consistency with those of the device side.

As shown in FIG. 1, a general flow for TRAP message processing in the prior art is that the user modifies the configuration data on the device with the use of the command lines, and the device sends to the network management system a TRAP message notifying the system of the occurrence of a change in the data of the device side. Upon receiving of the TRAP message, the network management system obtains the updated data from the device side, and updates the data in a database of the network management system. In this way, when there are a large number of TRAP messages reported from the device side, the network management system may discard some of the TRAP messages due to its limited capacity for processing the TRAP messages. In the case of a TRAP message(s) being lost, the network management system may not be aware of the occurrence of a change in the data of the device side, which results in inconsistency of the data stored in the database of the network management system with those of the device side.

The network management system performs timing data synchronization with the device being idle regardless of whether a change occurs in the data on the device. However, the configuration data on the device does not change frequently, so the network management system may suffer from low processing efficiency, much overhead, long-time synchronization, etc.

SUMMARY OF THE INVENTION

According to an embodiment of the present invention, a method for managing network device data is provided, the method including steps of:

after a configuration operation is performed on a device, the device sending a TRAP message notifying the network management system, wherein the method further includes:

identifiers are configured respectively for different types of device data at the device side;

the network management system stores the identifiers into a database upon storing the device data; and during TRAP message processing and timing data synchronization, the network management system compares the identifiers stored in the database with the corresponding identifiers sent from the device side, and performs an update in the case of inconsistency in the identifiers.

According to another embodiment of the present invention, a network management system is provided. A TRAP message is sent to the network management system from a device when a configuration operation is performed on the device. The system includes:

a first device for storing identifiers configured respectively for different types of device data at device side into a database upon storing the device data; and a second device for, during TRAP message processing and timing data synchronization, comparing the identifiers stored in the database with the corresponding identifiers sent from the device, and performing an update in the case of inconsistency in the identifiers.

According to yet another embodiment of the present invention, a system for managing network device data is provided. The system includes a network management system and a network device, wherein:

the network device is adapted to configure identifiers respectively for different types of device data and sends a TRAP message to the network management system when a configuration operation is performed on the network device; and the network management system is adapted to store the identifiers into a database upon storing the device data and compare the identifiers stored in the database with the corresponding identifiers sent from the network device during TRAP message processing and timing data synchronization, and performs an update in the case of inconsistency in the identifiers.

According to the embodiments of the present invention, the identifiers are stored at the device side respectively for different types of data, and the TRAP message sent from the device side is attached with the changed device data and the identifier of the type to which the device data belongs, so the network management system may obtain the data-related information from the received TRAP message and use the information to update the data in the database, which may eliminate the resending of a message for obtaining the updated configuration data from the network side, and thus reduce the number of times the network management system accesses the device and the load on the device. As for the determination of loss of TRAP messages, the network management system compares the identifier in the received TRAP message with the identifier stored in the database of the network management system with respect to the same type of data, and determines whether there occurs the loss of TRAP messages based on the comparison result. In the case of a TRAP message being lost, the network management system initiates a synchronization operation and retrieves all relevant data from the device. During the timing data synchronization, the identifiers are compared to determine whether the data of the device side are consistent with those in the database of the network management system, and the data synchronization is performed only in the case of inconsistency. Therefore, the efficiency of the synchronization for the network management system may be improved greatly.

BRIEF DESCRIPTIONS OF THE DRAWINGS

DETAILED DESCRIPTIONS OF THE EMBODIMENTS

In the embodiments of the present invention, the identifiers are configured respectively for device data, thus optimizing the TRAP message processing and the timing synchronization. Hereinafter, sequence numbers will be taken as example.

Figure 1:
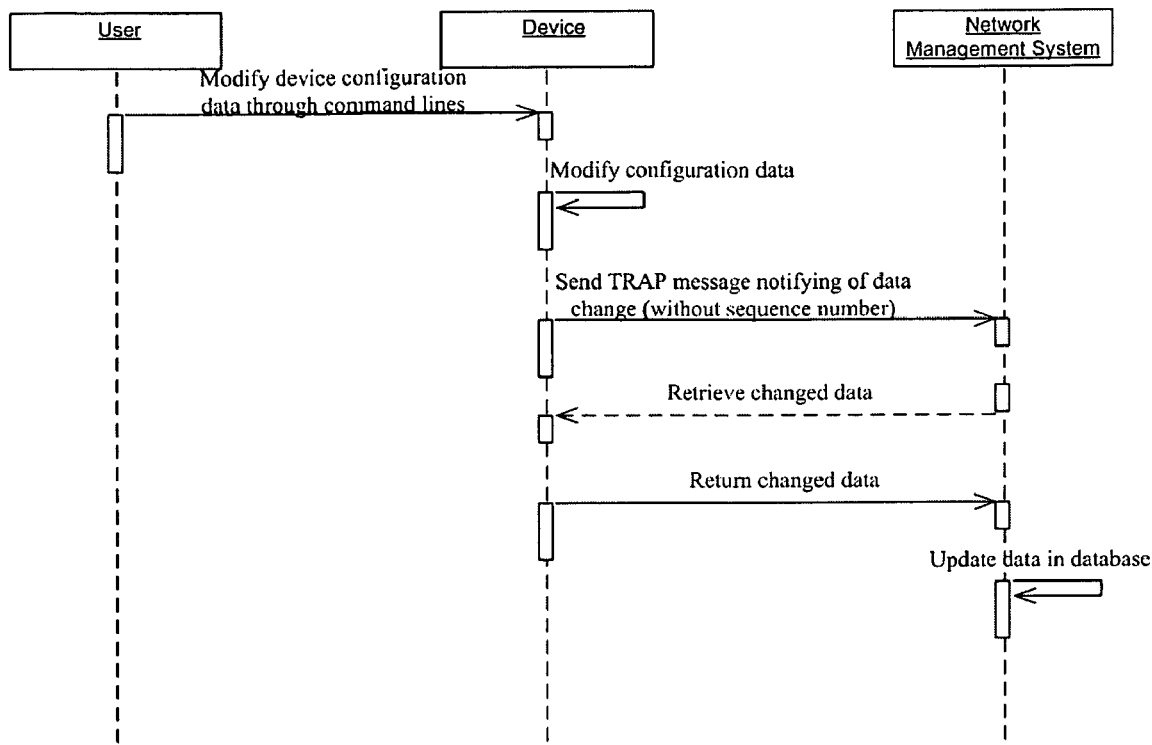
FIG. 1 is a flow chart for TRAP message processing in the prior art.
Figure 2:
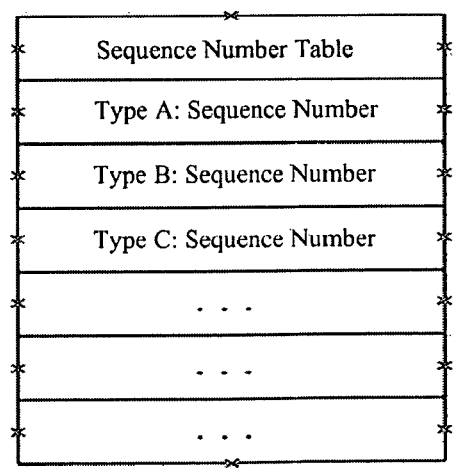
FIG. 2 is a structural diagram for a sequence number table according to an embodiment of the present invention.
Figure 3:
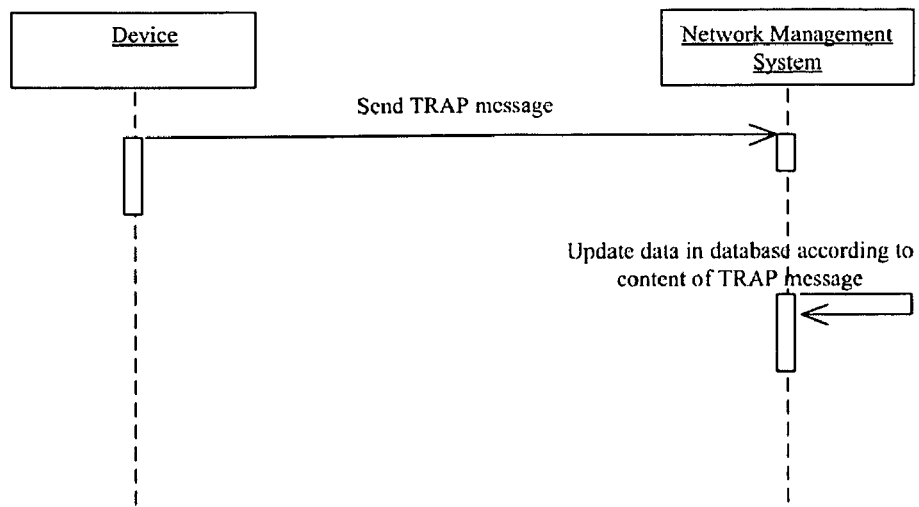
FIG. 3 is a diagram illustrating an update for a sequence number according to an embodiment of the present invention.

As shown in FIG. 2, sequence numbers are stored respectively for different types of data on the device side. The type of the sequence numbers may be defined as unsigned integer, and a uniform minimum value, such as zero, may be set for the sequence number of each type of data in initialization. During the synchronization of device data, the network management system stores the sequence numbers for the different types of data into a database of the network management system. As shown in FIG. 3, when a certain type of data has changed due to the entry of new configuration data by a user upon his logging in the device, the sequence number of the device side, which corresponds to this type of data, is increased by one, and a TRAP message is sent by the device to notify the network management system. During the TRAP message processing and the timing data synchronization, the network management system compares its local sequence number with the sequence number of the device side and performs a corresponding update based upon the comparison result.

Figure 4:
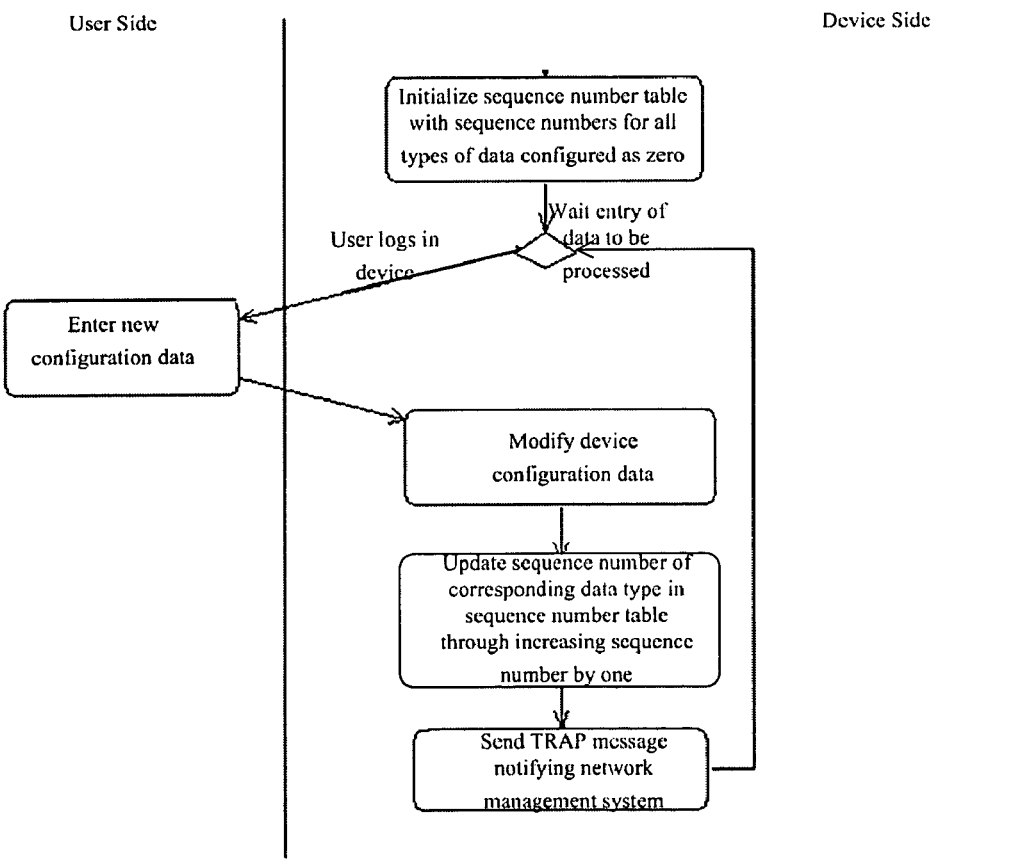
FIG. 4 is a flow chart for TRAP message processing according to an embodiment of the present invention.

As shown in FIG. 4, upon the occurrence of a change in the data of the device side, the device side sends a TRAP message to the network management system to notify the network management system of the occurrence of the change in the configuration data of the device. Since the TRAP message is attached with information related to the changed data, the network management system may obtain and use the data-related information from the TRAP message to update the data in the database.

Figure 5:
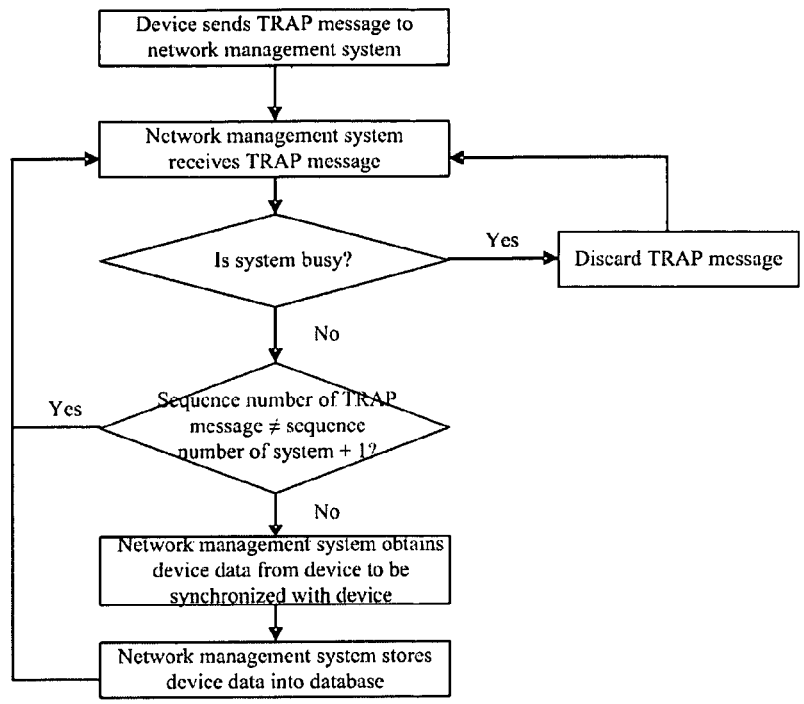
FIG. 5 is a processing flow chart in the case of a TRAP message being lost according to an embodiment of the present invention.

In the case that the device sends a large number of TRAP messages to the network management system, some of the TRAP messages may be discarded by the network management system due to its limited processing capacity for the TRAP messages. As shown in FIG. 5, the network management system recovers its TRAP message processing capacity after discarding some TRAP messages, and proceeds with processing the TRAP messages reported from the device. At this time, the network management system compares the sequence number contained in a TRAP message with that in the database; if the sequence number in the database plus 1 is equal to the sequence number contained in the TRAP message, which is indicative of no loss of TRAP messages, the network management system goes on with the determination on the next TRAP message; if the sequence number in the database plus 1 is not equal to the sequence number contained in the TRAP message, it may be determined that there occurs a loss of the TRAP message, that is, there occurs an inconsistency of part of data on the device with the data on the network management system. In the latter case, the network management system may initiate a data synchronization operation to retrieve all relevant data from the device and store these data into the database for the consistency of data. Then, the above procedures are repeated for the next TRAP message.

Figure 6:
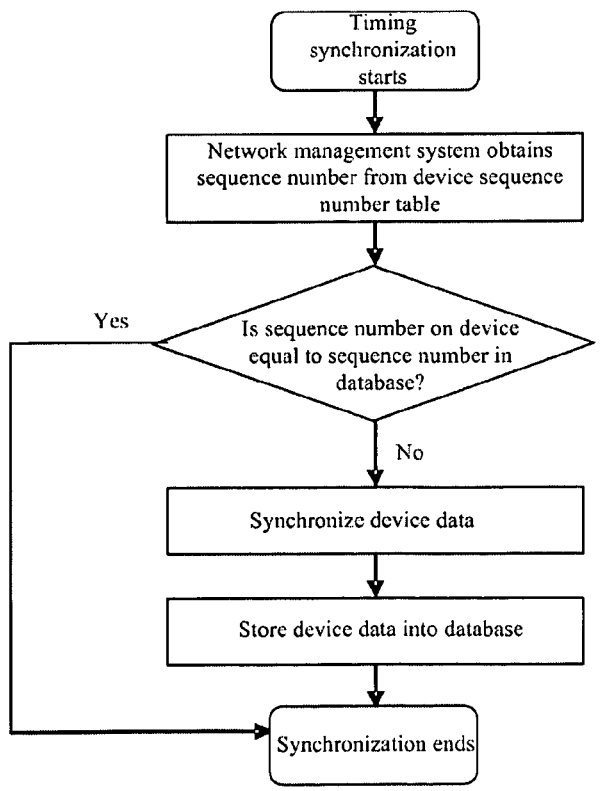
FIG. 6 is a flow chart for data synchronization according to an embodiment of the present invention.

During the timing synchronization of device data, as shown in FIG. 6, the network management system obtains the sequence number of a type of data to be synchronized from the device, and compares the obtained sequence number with the sequence number stored in the database. In the case of the two sequence numbers being equal to each other, the synchronization for this type of data is terminated directly; in the case of the sequence numbers being unequal, which is indicative of an inconsistency of the data of the device side with those of the network management system, the network management system needs to synchronize this type of data in its database with those on the device, and thus retrieves the relevant data from the device side and updates the corresponding data in the database of the network management system.

Figure 7:
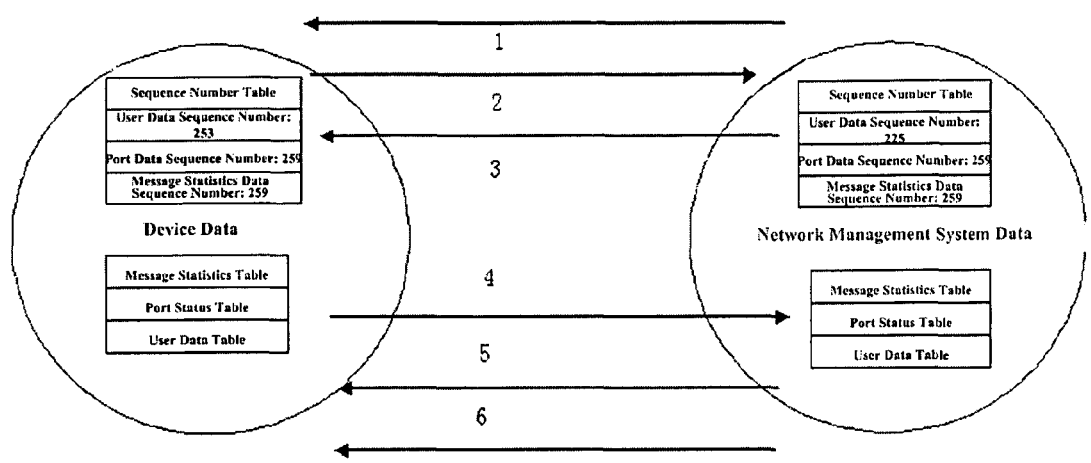
FIG. 7 is a flow chart for exemplary data synchronization according to an embodiment of the present invention.

Hereinafter, an example will be used to describe a procedure for timing synchronization of device data where three types of data are assumed, for example, user data, port data and message data. The procedure is as shown in FIG. 7.

Step 1: at a certain time, the network management system sends to the device side a message indicating timing data synchronization is to be initiated.

Step 2: the device side responds with the data of a sequence number table according to the message sent from the network management system.

Step 3: the network management system compares the sequence numbers sent from the device side with the sequence numbers stored in the database. After the comparison, the network management system determines that the sequence number of user data, i.e. 235, is not equal to the sequence number of user data stored in the database, i.e. 225, and then sends to the device side a message requesting for synchronization of this type of data, that is, user data.

Step 4: the device side sends the data of the user data table to the network management system according to the message sent the network management system, and the network management system stores the data of the user data table into the database.

Step 5: the network management system determines that the sequence number of port data on the device, i.e. 259, is equal to the sequence number of port data on the network management system, i.e. 259, and the synchronization procedure is omitted.

Step 6: the network management system determines that the sequence number of message statistics data on the device, i.e. 259, is equal to the sequence number of message statistics data on the network management system, i.e. 259, and the synchronization is omitted.

According to the embodiment of the present invention, the sequence numbers play the role of identification, which may be any other type of numbers besides unsigned integer, and also may be other symbols, letters or a combination thereof.

While the preferred embodiments of the present invention have been described as above, the scope of the present invention shall not be limited thereto, and those skilled in the art may make various variations and modifications to the embodiments without departing from the scope of the present invention. All these variations and modifications would fall within the scope of the present invention which shall be defined in the claims thereof.

What is claimed is:

1. A method for managing network device data, wherein a TRAP message is sent to a network management system when a configuration operation is performed on a device, the method further comprises:

configuring identifiers respectively for different types of device data at device side;

storing the identifiers into a database, by the network management system, upon storing the device data;

during TRAP message processing and timing data synchronization, comparing by the network management system the identifiers stored in the database with the corresponding identifiers sent from the device side, and performing by the network management system an update in the case of inconsistency in the identifiers, wherein the TRAP message contains information relevant to changed data, and wherein the information relevant to changed data comprises the changed device data and the identifier of the type to which the device data belongs;

extracting, by the network management system, the identifier from the TRAP message;

comparing the identifier with the corresponding device identifier stored in the database; and using the device data information contained in the TRAP message to update the data in the database, when the identifier extracted from the TRAP message is not consistent with the corresponding device identifier stored in the database.

2. The method according to claim 1, wherein the identifiers are selected from the group comprising sequence number, symbol and letter.

3. The method according to claim 2, wherein the type of sequence number comprises unsigned integer.

4. The method according to claim 3, wherein when there occurs a change in a certain type of data, the sequence number corresponding to this type of data is increased by one.

5. The method according to claim 4 further comprising: during the TRAP message processing, comparing, by the network management system, the sequence number contained in the TRAP message with the corresponding sequence number in the database of the network management system, and when the sequence number in the database of the network management system plus 1 is not equal to the sequence number in the TRAP message, initiating by the network management system a data synchronization operation, retrieving all relevant data from the device side and storing these data into the database.

6. The method according to claim 4 further comprising: during the timing data synchronization, obtaining, by the network management system, from the device side the sequence number of the type of data to be synchronized, and comparing the obtained sequence number with the sequence number stored in the database of the network management system;

when the two sequence numbers are identical, terminating the synchronization for this type of data, and when the two sequence numbers are not identical, retrieving relevant data from the device side and storing these data into the database.

7. A network management system, wherein a TRAP message is sent to the network management system from a device when a configuration operation is performed on the device, comprising:

a first device for storing identifiers configured respectively for different types of device data at device side into a database upon storing the device data;

a second device for, during TRAP message processing and timing data synchronization, comparing the identifiers stored in the database with the corresponding identifiers sent from the device, and performing an update in the case of inconsistency in the identifiers;

wherein the TRAP message contains information relevant to changed data, the information is selected from the group comprising the changed device data and the identifier of the type to which the device data belongs; and a third device for extracting the identifier from the TRAP message;

wherein the second device, using the device data information contained in the TRAP message, updates the data in the database when the identifier extracted from the TRAP message is not consistent with the corresponding device identifier stored in the database.

8. The system according to claim 7, wherein the identifiers are selected from the group comprising sequence number, symbol and letter.

9. The system according to claim 8, wherein the type of sequence number comprises unsigned integer.

10. The system according to claim 9, further comprising a fourth device for, when there occurs a change in a certain type of data, increasing the sequence number corresponding to this type of data by one.

11. The system according to claim 10, wherein during the TRAP message processing, the second device compares the sequence number contained in the TRAP message with the corresponding sequence number in the database of the network management system, and initiates a data synchronization operation and retrieves all relevant data from the device side and storing these data into the database when the sequence number in the database of the network management system plus 1 is not equal to the sequence number in the TRAP message.

12. The system according to claim 10, wherein during the timing data synchronization, the second device obtains from the device side the sequence number of the type of data to be synchronized, and compares the obtained sequence number with the sequence number stored in the database of the network management system, and when the two sequence numbers are not identical, the second device retrieves relevant data from the device side and stores these data into the database; and the network management system further comprises a fifth device for, during the timing data synchronization, terminating the synchronization for this type of data when the two sequence numbers are identical.

13. A system for managing network device data, comprising a network management system and a network device, wherein the network device is adapted to configure identifiers respectively for different types of device data and sends a TRAP message to the network management system when a configuration operation is performed on the network device wherein the TRAP message contains information relevant to changed data, and wherein the information relevant to changed data comprises the changed device data and the identifier of the type to which the device data belongs; and the network management system is adapted to store the identifiers into a database upon storing the device data and compare the identifiers stored in the database with the corresponding identifiers sent from the network device during TRAP message processing and timing data synchronization, and performs an update in the case of inconsistency in the identifiers.

* * * * *

UNITED STATES PATENT AND TRADEMARK OFFICE
CERTIFICATE OF CORRECTION

PATENT NO. : 7,711,816 B2
APPLICATION NO. : 11/607801
DATED : May 4, 2010
INVENTOR(S) : Guangwei Liu, Jie Luo and Zhonghui Huang It is certified that error appears in the above-identified patent and that said Letters Patent is hereby corrected as shown below:

Title page, Item (54) and Col. 1, Title should read "Method for Managing Network Device Data and Network Management System".

Signed and Sealed this

Twenty-seventh Day of July, 2010

David J. Kappos
*Director of the United States Patent and Trademark Office*